Feb. 8, 1944.  E. J. SHIMEK  2,341,164
PIPE OR ROD JOINT CONNECTION AND SEAL
Filed Nov. 26, 1940  3 Sheets-Sheet 3
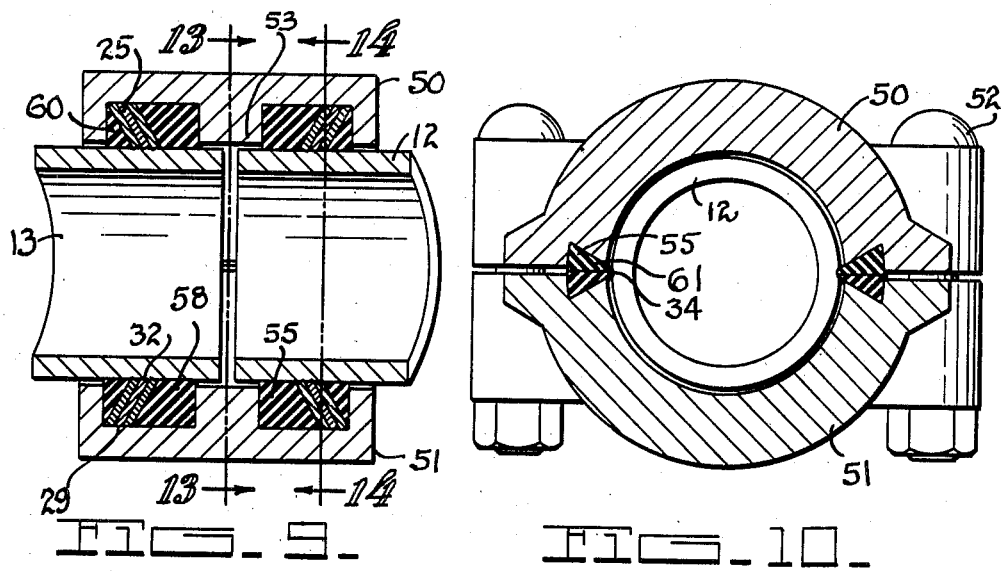
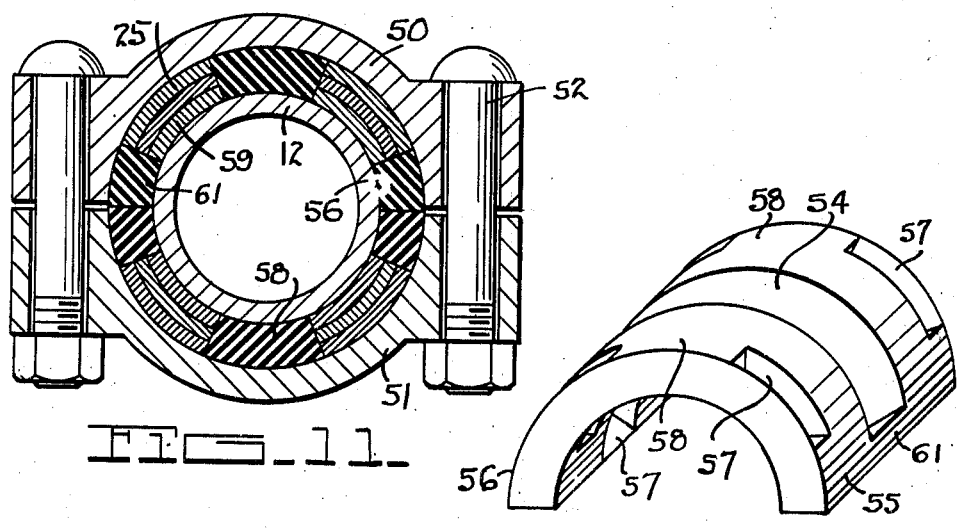
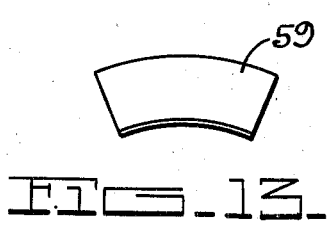
E. J. SHIMEK
INVENTOR.
BY Lester B. Clark
ATTORNEY Patented Feb. 8, 1944

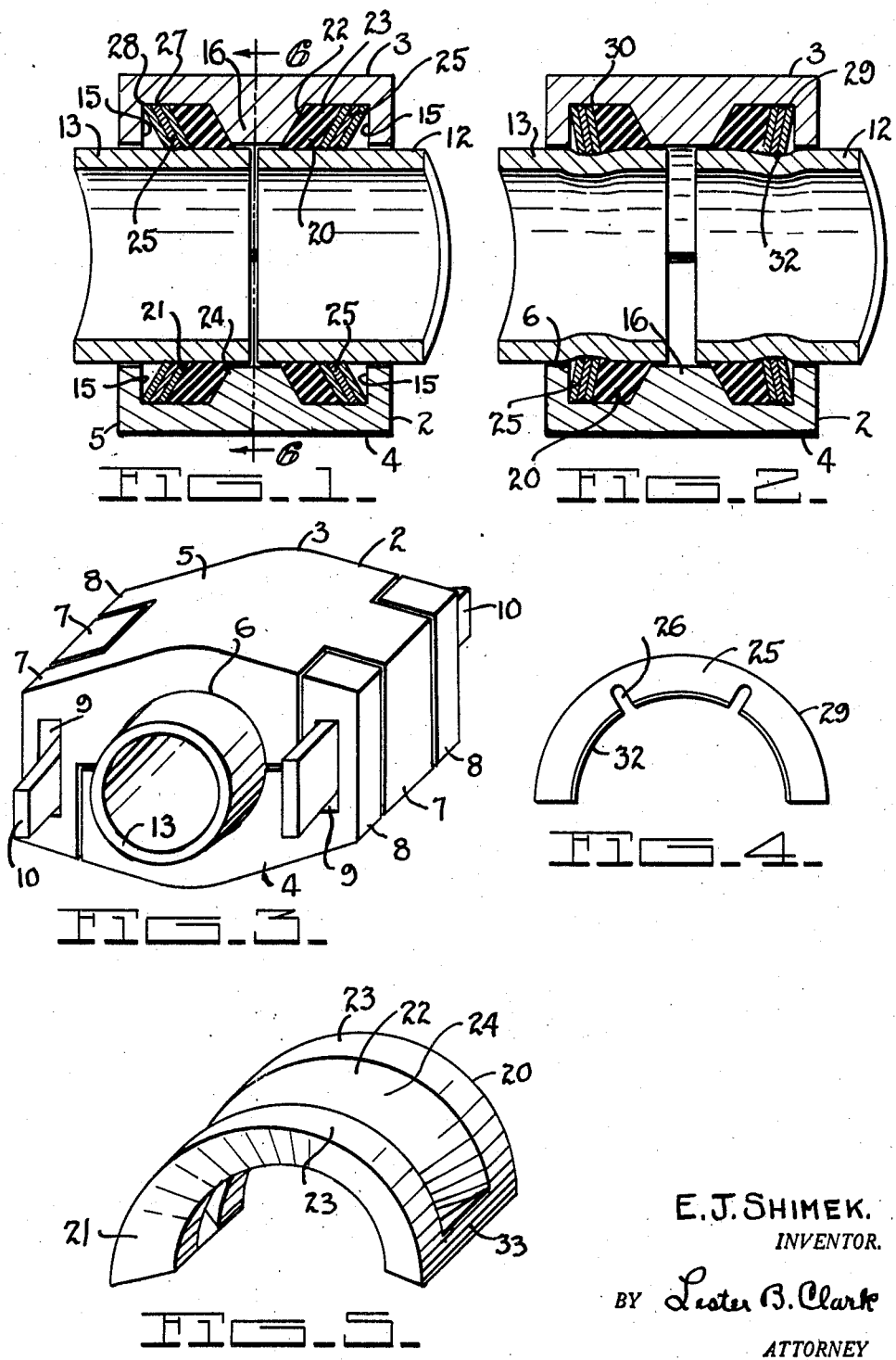

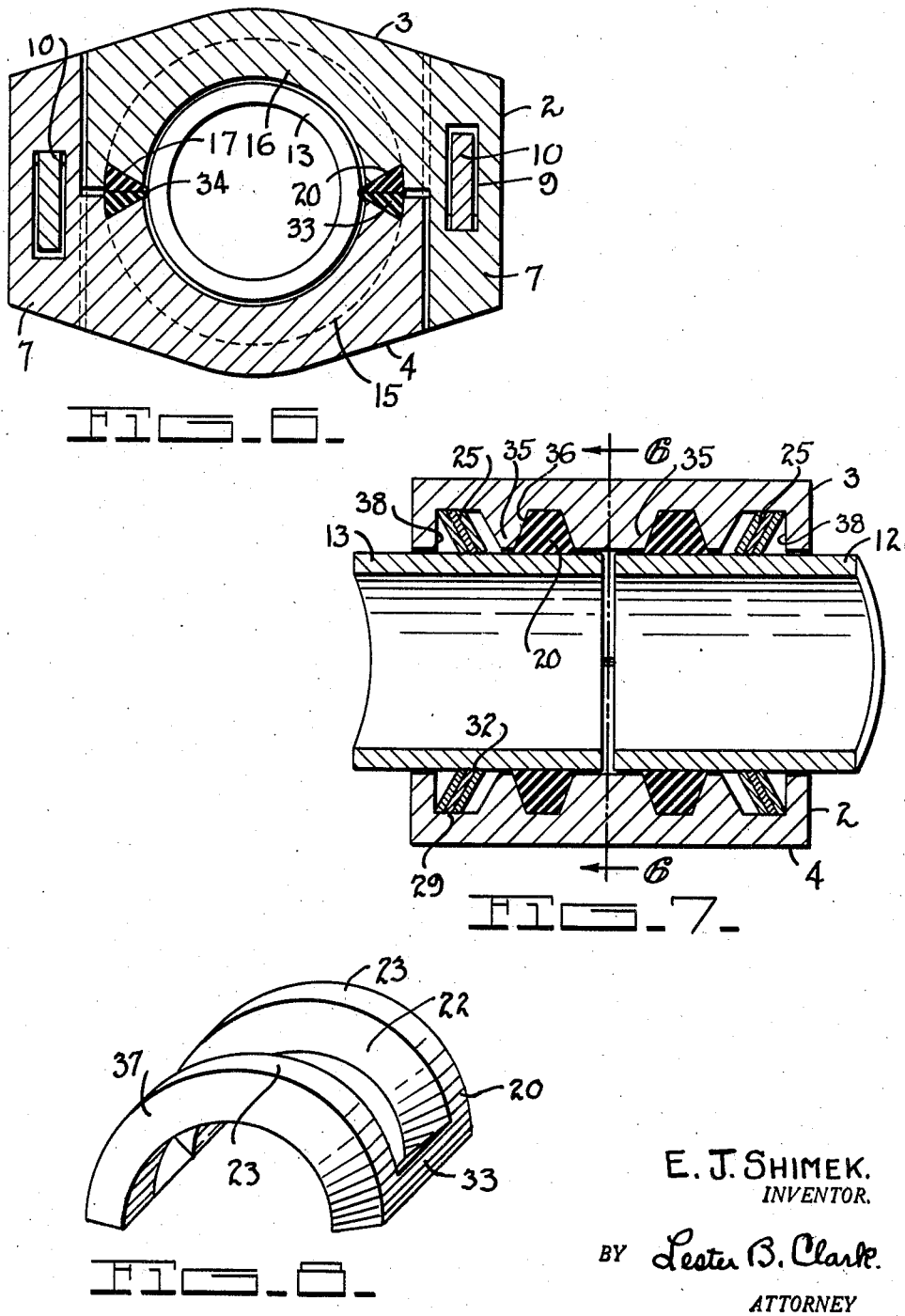

2,341,164

UNITED STATES PATENT OFFICE 2,341,164

PIPE OR ROD JOINT CONNECTION AND SEAL

Edwin J. Shimek, Dallas, Tex.

Application November 26, 1940, Serial No. 367,208

4 Claims. (Cl. 285—194)

The invention relates to a pipe or rod joint connection and seal wherein it is intended that the joint can be simply and economically constructed and quickly assembled and disassembled while providing a gripping connection which will also form a seal.

The present invention relates to the same general subject matter as my copending application, Serial No. 335,098 filed May 14, 1940, the present disclosure being directed, however, to different forms and applications of the gripping and packing assembly.

It is one of the objects of the invention to provide a pipe or rod joint connection wherein inclined gripping members are adapted to be tilted or canted in order to effect a gripping action upon the pipe.

Another object of the invention is to provide a combination gripping and sealing joint for plain end rod or pipe members so that the end is gripped and a seal formed therewith simultaneously.

Still another object of the invention is to provide an interlocking housing construction for a combination gripping and sealing connection.

Still another object of the invention is to provide segmental gripping and sealing members for incorporation in an interlocking housing for gripping a pipe or rod end.

Other and further objects of the invention will be readily apparent when the following description is considered in connection with the drawings, wherein:

Fig. 1 is a vertical sectional view of a pair of pipe ends to which the invention has been applied and illustrates the pipe ends as having been inserted into the assembly.

Fig. 2 is a section of the assembly of Fig. 1, but illustrates the parts when a pull has been exerted on the pipe ends so as to effect a gripping and sealing action thereof.

Fig. 3 is a perspective view of the interlocking sectional housing used to support the gripping and packing assembly.

Fig. 4 is a segment of the gripping ring.

Fig. 5 is a perspective of the packing segment.

Fig. 6 is a section taken on the line 6—6 of either Fig. 1 or Fig. 7.

Fig. 7 is a vertical sectional view showing a tandem type of packing and gripping assembly where the packing and gripping elements are spaced apart.

Fig. 8 is a perspective view of a unitary type of packing segment used in Fig. 7.

Fig. 9 is a vertical sectional view of another form of the invention wherein a pair of cap members are used to clamp the gripping and packing assemblies in position.

Figs. 10 and 11 are sections taken on the corresponding sectional lines of Fig. 9.

Fig. 12 is a perspective view of the packing segment of Fig. 11.

Fig. 13 is a flat view of one of the gripper elements.

Fig. 3 shows a perspective view of the general structure of the device wherein a housing 2 is made up of identical interlocking parts 3 and 4. These parts are inverted relative to each other and may be designated as cap members in that they are arranged to confine the gripping and sealing assembly. Each cap member is made up of a body 5 having the arcuate passage 6 therethrough and one end has a lug 7, while two lugs 8 are provided on the opopsite end in spaced relation so as to receive the lug 7 of the other complementary cap member.

Extending through the lugs of both the members are the openings 9 which are arranged to receive the wedge or locking bar 10 which will be driven through the openings 9 which are so arranged that the bar 10 will draw the two cap members together in order to secure them firmly against separation.

Fig. 1 shows a vertical section along the axis of the pipe ends 12 and 13. The upper half of Fig. 1 illustrates the cap 3 while the bottom half is a section of the cap 4. Each of these caps is formed with an internal semicircular recess 15 therein and these recesses are defined or spaced apart by a semicircular rib 16. The extent of the rib 16 is illustrated in Fig. 6 where the ends thereof are beveled at 17 away from the central passage 6 so as to form a clamping action against the sealing element when the device is assembled.

A packing segment 20 is shown in Fig. 5 as being semicircular in configuration and having inclined or beveled ends 21. An opening or a curved slot 22 is provided in the body of this packing segment in order to receive the rib 16. The element will thus be fitted into the position shown in Fig. 1 so as to enclose the rib 16 with the sealing areas 23 on each side of the groove 22 disposed in the recess 15. The inclined faces 24 of the slot 22 fit against the inclined faces of the rib 16 so as to form a seal, while the inclined ends 21 of the packing are arranged to receive the gripper elements or segments 25. This element, as seen in Fig. 4, is a semicircular rigid member preferably of metal which has the openings 26 therein to provide some flexibility therein.

As seen in Fig. 1, a plurality of these gripper elements may be positioned in the recess 15 so as to abut the face 21 of the packing.

It should be noted that the outermost element 27 is arranged to seat in the corner 28 of the recess 15 so that the assembly is firmly positioned. The outer periphery 29 of each of the gripper segments fits against the periphery 30 of the recess 15. It seems apparent when the inclined gripper segments 25 are positioned as shown in Fig. 1 with the packing assembly in position, that when a pull is exerted upon the pipe ends 12 and 13 that there will be a tendency for the pipe ends to pull apart, and as seen in Fig. 2, the pipe ends 12 and 13 have moved apart a short distance as compared with the position of Fig. 1. The inner gripping end of 32 of the gripper elements engages the periphery of the pipe end so that when the pipe end moves slightly in tending to slide out of the housing the gripper elements will tilt or cant to the position shown in Fig. 2.

Inasmuch as the cap members 3 and 4 are of massive construction to withstand heavy stresses, it seems obvious that as these gripper elements are titled that they will be forced against the housing. Inasmuch as the housing is firmly locked together, however, and is of greater strength than the pipe end, the gripper elements will bite into the pipe end and if sufficient pull is exerted on the pipe it will be deformed by this action as illustrated diagrammatically in Fig. 2.

Any pressure inside of the pipes 12 and 13 will flow outwardly between the ends of the pipe and into the area at the base of the slot or groove 22 so that it will tend to force the two body portions 23 of the packing apart. This will assist in maintaining a seal between the housing and the pipe ends.

Attention is directed to the connecting portion 33 of the packing segment 20 which joins the body portions 23 at the ends of the slot 22, because this web portion, as seen in Fig. 6, will form a seal between the two cap members at the sides of the joint and also form a seal with the beveled ends 17 of the complementary ribs and when the cap members are clamped together the resilient material will be forced inwardly to abut the pipe and assist in forming a seal at the point 34 as seen in Fig. 6.

It seems obvious that the combination gripping and sealing assembly can be readily attached or removed relative to the pipe ends by knocking out the locking bars 10, or if desired the assembly may be placed together and the pipe ends driven thereinto and then pulled slightly so as to seat the gripping elements and effect a seal.

Fig. 7 shows a modified form of the device of Fig. 1 which is substantially the same as Fig. 1 insofar as the central and end portions are concerned. The caps 3 and 4, however, are made somewhat longer and are provided with spacer ribs 35 having an inclined face 36 which is arranged to receive the outer face 37 of the packing segment. This face 37 is inclined oppositely to the face 21 of the packing in Fig. 5. In this manner the packing will be confined between the ribs 16 and 35 and the gripper elements 25 are spaced in a separate recess 38 where they will not abut against the packing but will operate to grip the pipe independently of the sealing action. The remaining portions of this construction of Fig. 7 is the same as previously described.

Figs. 9 to 13 inclusive show another form of the invention which is almost identical with that shown in Fig. 1 insofar as the internal construction of the parts is considered. The cap members are not interlocking, however, but are shown as two complementary caps 50 and 51 which are clamped together with the bolts 52. Inside of these caps is a rib 53 which is rectangular in cross section and is arranged to fit into the slot or opening 54 in the combination packing and gripping assembly 55. The packing element 56 of this assembly is of a peculiar construction as seen in Fig. 12, in that it has a central slot 54 corresponding to the slot 22 in the packing segment 20 of Fig. 5 but in addition it has small openings 57 spaced in each of the body portions 58, which openings are also arranged to receive the gripper plates 59 seen in Fig. 13. In this manner the gripper elements will have a web 60 of packing on the outer end thereof which will tend to be compressed as the plates are tilted to gripping position. When the parts are assembled and in position there will be alternate circumferential segments of gripper plates and packing material, as seen in the section of Fig. 11. The end webs 61 will form a seal between the cap plates as described in connection with the web 33 of Fig. 5.

Broadly the invention contemplates a combination gripping and sealing coupling for pipe or rod ends.

What is claimed is:

1. A rod or pipe joint coupling including a separable housing, packing segments disposed in said housing to encircle the rod or pipe ends, a recess in the packing segments, a projection extending from the housing into such recess to position and compress the packing to provide a seal, and gripping elements also carried in said housing to grip and retain the rod or pipe ends against withdrawal.

2. A rod or pipe joint coupling including a separable housing, packing segments disposed in said housing to encircle the rod or pipe ends, a recess in the packing segments, a projection extending from the housing into such recess to position and compress the packing to provide a seal, and gripping elements also carried in said housing to grip and retain the rod or pipe ends against withdrawal, said projection spanning the rod or pipe ends so that the packing provides a seal with each end.

3. A rod or pipe end coupling packing comprising a segmental body of an arc to fit about the rod or pipe, an arcuate recess in said body defined by inclined wall faces to receive a portion of the housing which confines the packing so that the packing will be forced into firm sealing engagement with the rod or pipe and the housing.

4. A segmental rod or pipe end packing to be clamped in sealing position by a confining housing comprising a body of resilient material of semi-cylindrical configuration, a recess extending thru said body from the peripheral surface, said recess having tapered walls so as to provide a wide inside face to contact the rod or pipe and to provide a wedging face to receive a portion of the housing which confines the packing.

EDWIN J. SHIMEK.